US006081628A

United States Patent [19]

Lee

[11] Patent Number: 6,081,628

[45] Date of Patent: Jun. 27, 2000

[54] FLAT BED TYPE SCANNER WITH A FUNCTION OF AUTOMATICALLY FEEDING DATA SHEETS ONE AT A TIME

[75] Inventor: Dean Lee, Taipei, Taiwan

[73] Assignee: Behavior Tech Computer Corporation, Taipei, Taiwan

[21] Appl. No.: 09/003,728

[22] Filed: Jan. 7, 1998

[51] Int. Cl.[7] .......................... G06K 7/00

[52] U.S. Cl. .......................... 382/312; 358/474

[58] Field of Search .......................... 382/312; 355/67; 399/367, 371, 17; 358/488, 498, 474, 496, 296; 400/55

[56] References Cited

U.S. PATENT DOCUMENTS

| | | | |
|---|---|---|---|
| 5,077,585 | 12/1991 | Watanabe et al. | 399/367 |
| 5,713,674 | 2/1998 | Nakayama et al. | 400/55 |
| 5,819,151 | 10/1998 | Naito et al. | 399/367 |
| 5,825,513 | 10/1998 | Hasegawa | 358/498 |
| 5,831,749 | 11/1998 | Tseng et al. | 358/474 |
| 5,857,130 | 1/1999 | Ueda et al. | 399/17 |
| 5,867,278 | 2/1999 | Takahashi et al. | 358/296 |
| 5,909,290 | 6/1999 | Kajiwara | 358/488 |

*Primary Examiner*—Amelia Au
*Assistant Examiner*—Vikkram Bali
*Attorney, Agent, or Firm*—Holland & Hart LLP

[57] ABSTRACT

Disclosed is a flat bed type scanner capable of feeding data sheets one at a time including a scanning table with an optical module installed therein, a cover plate pivotally installed at an end of and covering the surface of the scanning table, and an automatic sheetfed device installed at a predetermined location on the cover plate. A set of inlet rollers and a set of outlet rollers in the automatic sheetfed device are respectively driven by a set of speed reduction gears driven by a motor and respectively located at inner sides of an inlet and an outlet. Two switches respectively installed at the inner side of the inlet respectively control the power of the motor and the optical module. In addition to providing a common scan function, the present invention has another choice of selecting an automatic sheetfed function.

18 Claims, 7 Drawing Sheets

30 20 12 21 101 102 13 10 11 100

31
40
33
34
30
101
50
32
20

FLAT BED TYPE SCANNER WITH A FUNCTION OF AUTOMATICALLY FEEDING DATA SHEETS ONE AT A TIME

BACKGROUND OF THE INVENTION

1. The Field of the Invention

The present invention relates to a flat bed type scanner, and more particularly to a flat bed type scanner capable of automatically feeding data sheets one at a time in which an automatic sheetfed device is installed on a cover plate for providing a function of automatically feeding data sheets one at a time in addition to a common scan function.

2. Description of the Related Art

A scanner is one of the essential items of equipment among the computer peripheral devices and currently, a flat bed type scanner is the most popular one in the market. The configuration of a flat bed type scanner mainly includes a scanning table and a cover plate for covering the scanning table. Similar to a copying machine, an operation method of the flat bed type scanner includes steps that the cover plate is lifted to prepare for a scan operation, and then, after a data sheet is put flatly on the scanning table with data facing down, the cover plate is laid over the data sheet, and finally, a switch is turned on to activate an optical module to scan the data sheet by moving the optical module horizontally.

Although the operation method of the conventional flat bed type scanner described above is known by common users, there still exists some disadvantages.

Problems such as repeated lifting and covering of the cover plate and alignment in position of the data sheet give inconvenience to a user when using the conventional scanner. Therefore, some shortcomings in the conventional scanner need to be overcome.

SUMMARY OF THE INVENTION

The present invention is directed to a flat bed type scanner capable of automatically feeding data sheets one at a time.

An objective of the present invention is to provide a flat bed type scanner capable of automatically feeding data sheets one at a time so that both a common scan operation and an automatic sheetfed operation can be performed.

In accordance with one aspect of the invention, there is provided a flat bed type scanner being capable of feeding data sheets one at a time including a scanning table, a cover plate pivotally joined to an end of the scanning table and covering documents etc. to be scanned, and an automatic sheetfed device located at a predetermined position on the cover plate, in which the automatic sheetfed device includes an inlet and an outlet defined at two opposite sides thereof and internally includes a motor, a set of speed reduction gears driven by the motor, a set of inlet rollers located at an inner side of the inlet and driven by the set of speed reduction gears, a set of outlet rollers located at an inner side of the outlet and also driven by the set of speed reduction gears, a detecting switch located at a front end of the set of inlet rollers for controlling the ON/OFF of the motor, and a scan activating switch located at a rear end of the set of inlet rollers for controlling the start and stop of the optical module.

In accordance with another aspect of the invention, there is provided a flat bed type scanner being capable of automatically feeding data sheets one at a time, in which the scanning table internally includes a transparent board on the upper surface thereof, a driving mechanism, and an optical module reciprocating in a horizontal direction driven by the driving mechanism.

In accordance with still another aspect of the invention, there is provided a flat bed type scanner being capable of automatically feeding data sheets one at a time, in which the driving mechanism includes a motor, a set of speed reduction gears and a drive belt driven by the set of speed reduction gears and combined with the optical module.

BRIEF DESCRIPTION OF THE DRAWINGS

The above objective, other features and advantages of the present invention will become more apparent by describing in detail the preferred embodiment thereof with reference to the attached drawings, in which.

DETAILED DESCRIPTION OF THE PREFERRED EMBODIMENT

Figure 1:
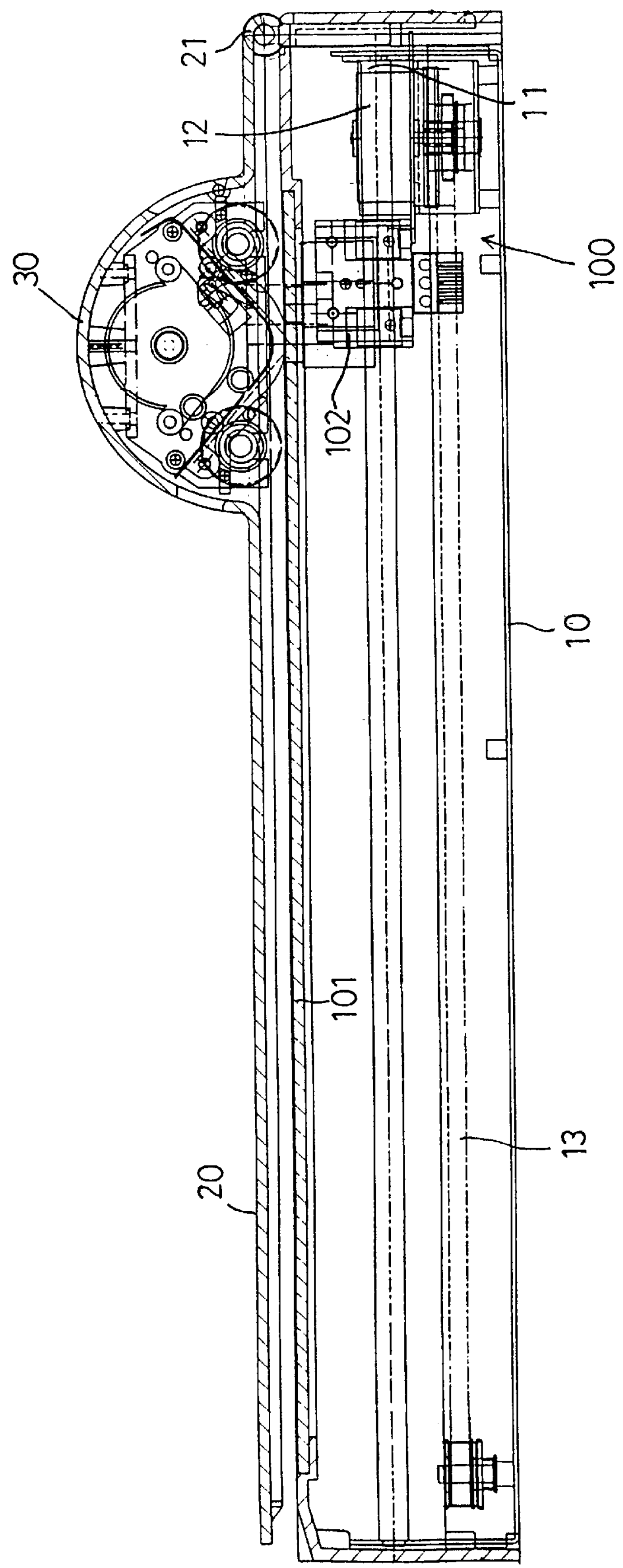
FIG. 1 is an elevational view in section showing a flat bed type scanner capable of automatically feeding data sheets one at a time in accordance with the present invention.

As shown in FIG. 1, a flat bed scanner with a function of automatically feeding data sheets one at a time in accordance with the present invention includes a scanning table 10, a cover plate 20 pivotally connected to an end of an upper surface of the scanning table 10, and an automatic sheetfed device 30 located at a specified position of the cover plate 20.

The scanning table 10 internally includes a transparent board 101 on the upper surface thereof, a driving mechanism 100, and an optical module 102 reciprocating in a direction parallel to the transparent board 101 and driven by the driving mechanism 100 in the scanning table 10.

Figure 4:
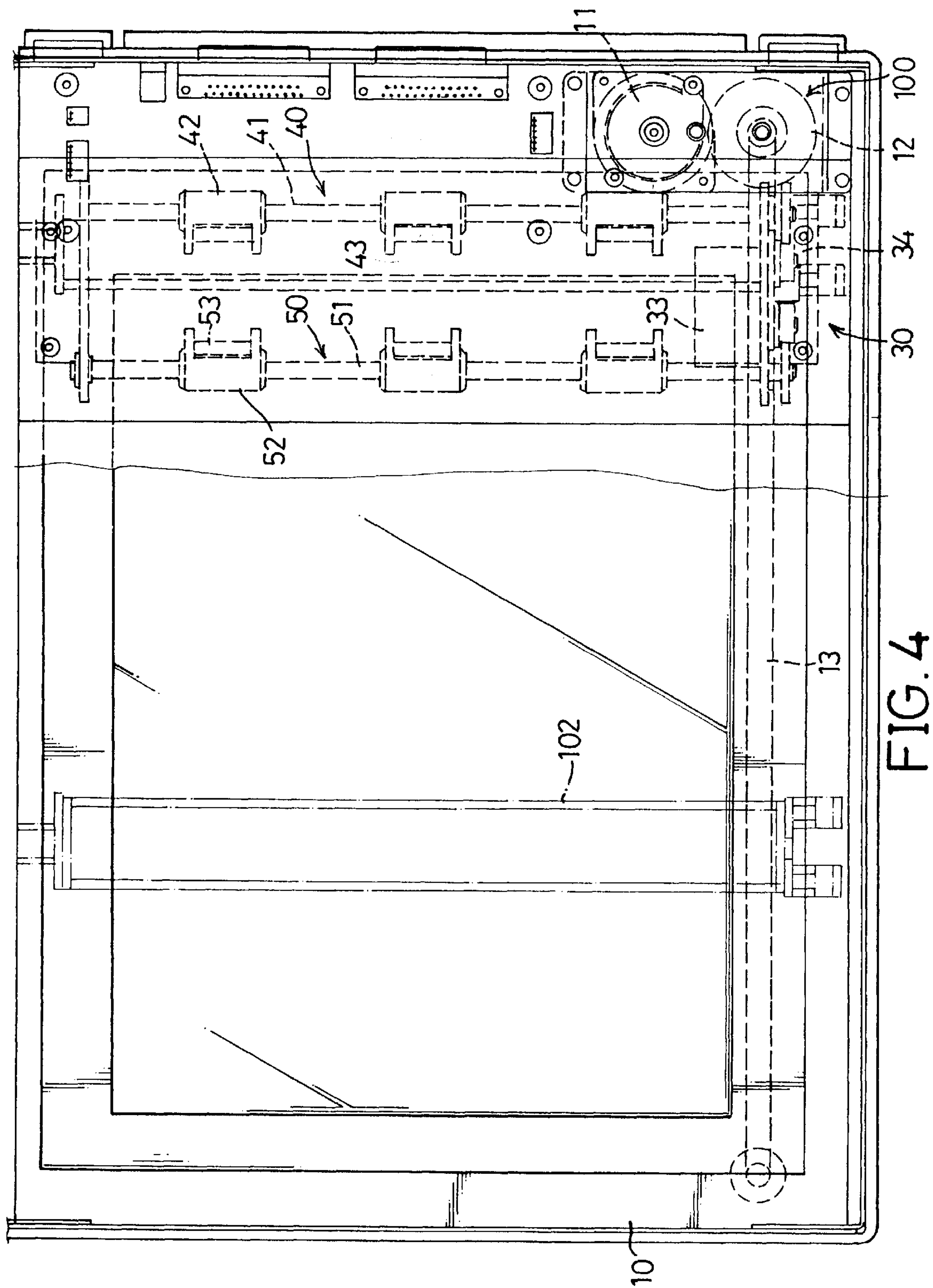
FIG. 4 is a top plan view showing the flat bed type scanner capable of automatically feeding data sheets one at a time in accordance with the present invention.

With reference to FIG. 1 and FIG. 4, the driving mechanism 100 includes a motor 11, a set of speed reduction gears 12 and a drive belt 13 driven by the set of speed reduction gears 12, in which the drive belt 13 is combined with the optical module 102 to drive the optical module 102 reciprocally.

The optical module 102 is composed of a contact image sensor (CIS) or a charge coupled device (CCD) image detector. A top face of the optical module 102 moves closely along a bottom face of the transparent board 101 in order to scan a data sheet which is put flatly on the transparent board 101 or fed by the automatic sheetfed device 30. If the optical module 102 is driven to move reciprocally by the driving mechanism 100, the data sheet is scanned by putting the data sheet on the surface of the transparent board 101, that is, the scanner performs a common scan operation. If the optical module 102 stays at a fixed position below the automatic sheetfed device 30, the data sheet is scanned by feeding the data sheet through the automatic sheetfed device 30.

The cover plate 20 has a pivot structure 21 installed on an end thereof such that the cover plate 20 is pivotally connected to an end of the scanning table 10 and thus it can be lifted from the surface of the scanning table 10 by pivoting the pivot structure 21 as well as returned to cover the surface of the scanning table 10.

The automatic sheetfed device 30 is installed at the specified position on the cover plate 20 and the space under the specified position of the cover plate 20 is transparent so that the optical module 102 can scan to read the data sheet fed by the automatic sheetfed device 30.

Figure 2:
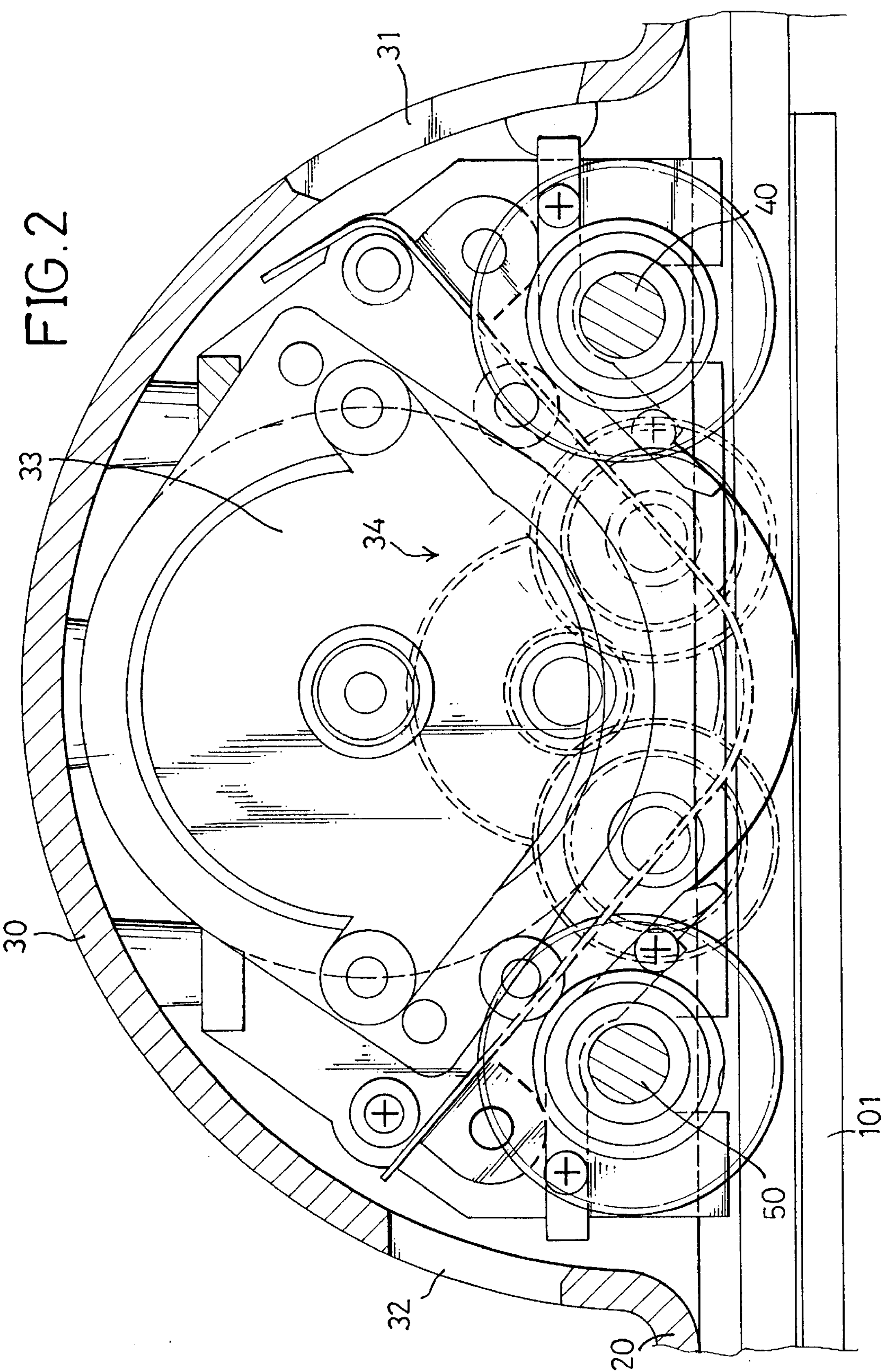
FIG. 2 is an enlarged view illustrating part of the present invention.
Figure 3:
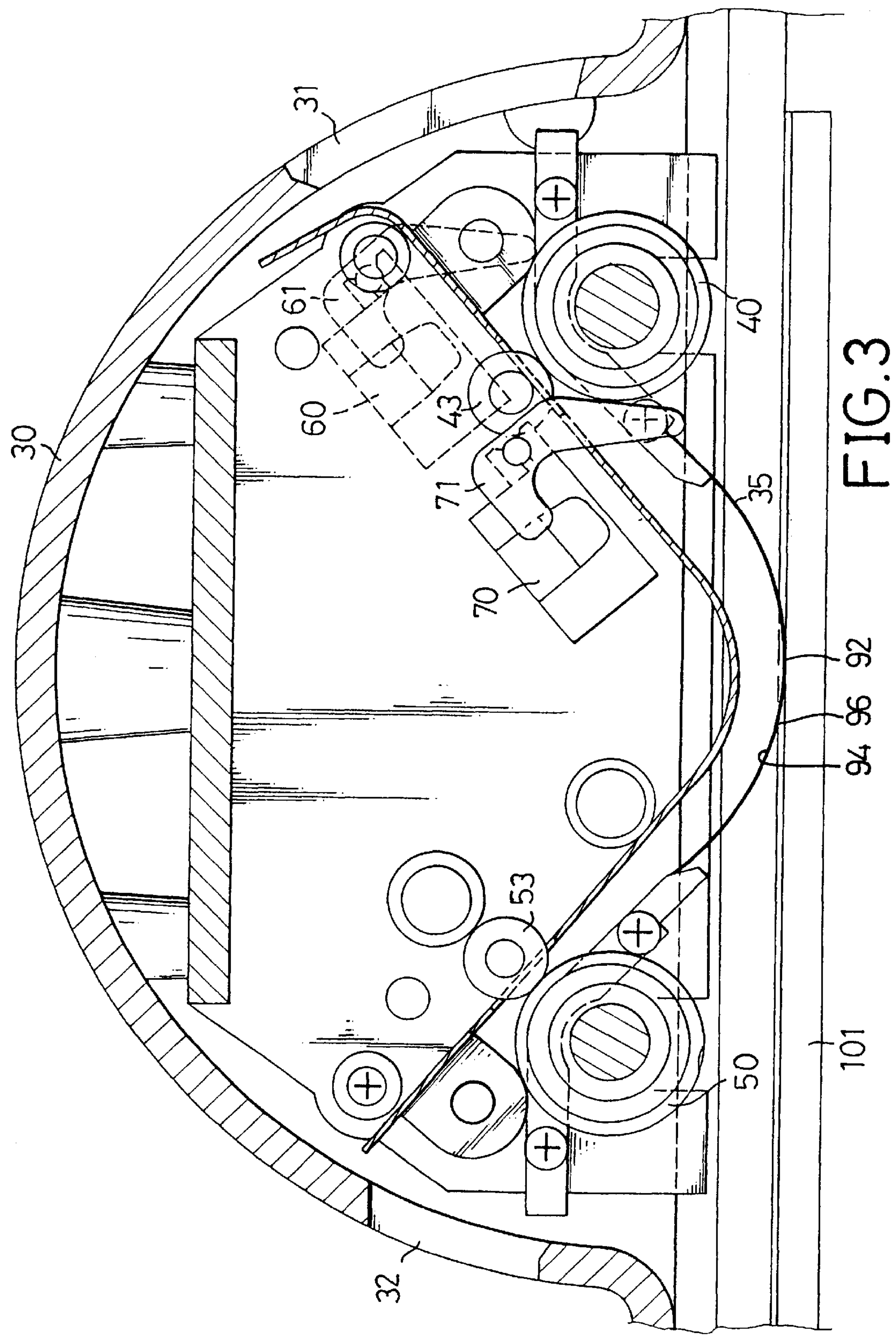
FIG. 3 is another enlarged view illustrating part of the present invention.

An inlet 31 for paper and an outlet 32 for paper are respectively defined at opposite sides of the automatic sheetfed device 30, as shown in FIG. 2. With reference to FIGS. 2 and 3, the automatic sheetfed device 30 internally contains a motor 33, a set of speed reduction gears 34 driven by the motor 33, a set of inlet rollers 40 for paper and driven by the set of speed reduction gears 34 and located at an inner side of the inlet 31, a set of outlet rollers 50 for paper and also driven by the set of speed reduction gears 34 and located at an inner side of the outlet 32, a detecting switch 60 for incoming paper and located at the inner side of the inlet 31 and a front end of the set of inlet rollers 40, and a scan activating switch 70 located at a rear end of the set of inlet rollers 40. The motor 33 concurrently drives the inlet rollers 40 and the outlet rollers 50 through the speed reduction gears 34 so that the former rotates in a counter-clockwise direction while the latter rotates in a counter-clockwise direction when seen from a direction as shown in FIG. 3.

With reference to FIGS. 2 and 4, the set of inlet rollers 40 and the set of outlet rollers 50 are respectively formed by installing a respective plurality of rollers 42, 52 on a respective shaft lever 41, 51, in which each of the respective rollers 42 and 52 respectively has a corresponding passive roller 43, 53, which can be relatively rotated, installed on a relative position to relatively roll in or out the data sheet.

As shown in FIG. 3, the detecting switch 60 is installed at the inner side of the inlet 31 for detecting whether a data sheet is fed from the inlet 31 by a user. A first activation tab 61 is pivotally connected with the detecting switch 60 and correspondingly positioned between the set of inlet rollers 40 and the relatively rotating passive rollers 43. When the data sheet is fed in from the inlet 31, the first activation tab 61 is firstly touched and the detecting switch 60 is then enabled to activate the motor 33. By means of the speed reduction gears 34, the inlet rollers 40 and the outlet rollers 50 start to rotate and the data sheet is subsequently taken in by the inlet rollers 40 and the corresponding passive rollers 43.

The scan activating switch 70 is installed at the rear end of the inlet rollers 40. Also, a second activation tab 71 is pivotally connected with the scan activating switch 70 and correspondingly positioned between the inlet rollers 40 and the relatively rotating passive rollers 43. When the data sheet exists from the inlet rollers 40, the second activation tab 71 is pushed to enable the scan activating switch 70 to activate the optical module 102 to begin scanning to read the images or character patterns on the data sheet.

Furthermore, a transparent guiding board 35 is fitted under the automatic sheetfed device 30. The transparent guiding board 35 is bent to form a parabolic shape hanging a vertex 92 with an opening facing upward so that an inner bottom 94, or a top surface, thereof defines a concaved guiding surface and an outer bottom 96, or a bottom surface, thereof is in close contact with the transparent board 101 of the scanning table 10. With one end of the transparent guiding board 35 corresponding to the inlet rollers 40 and the other end thereof corresponding to the outlet rollers 50 and extending continuously there between, the primary function of the transparent guiding board 35 is to lead the data sheet to be moved along a predetermined path and in favor of accurately scanning the data sheet by the optical module 102.

An operation of the flat bed type scanner with a function of automatically feeding data sheets one at a time in accordance with the present invention is described as follows with reference to FIGS. 5 to 7.

When a function for scanning a data sheet 80 by performing an automatic sheetfed operation with one sheet at a time is selected, the data sheet 80 can be fed directly by the automatic sheetfed device 30 without requiring the lifting of the cover plate 20 of the scanning table 10. Before the data sheet 80 is rolled in, the optical module 102 in the scanning table 10 and the automatic sheetfed device 30 are in a standby state with no action at all.

Figure 5:
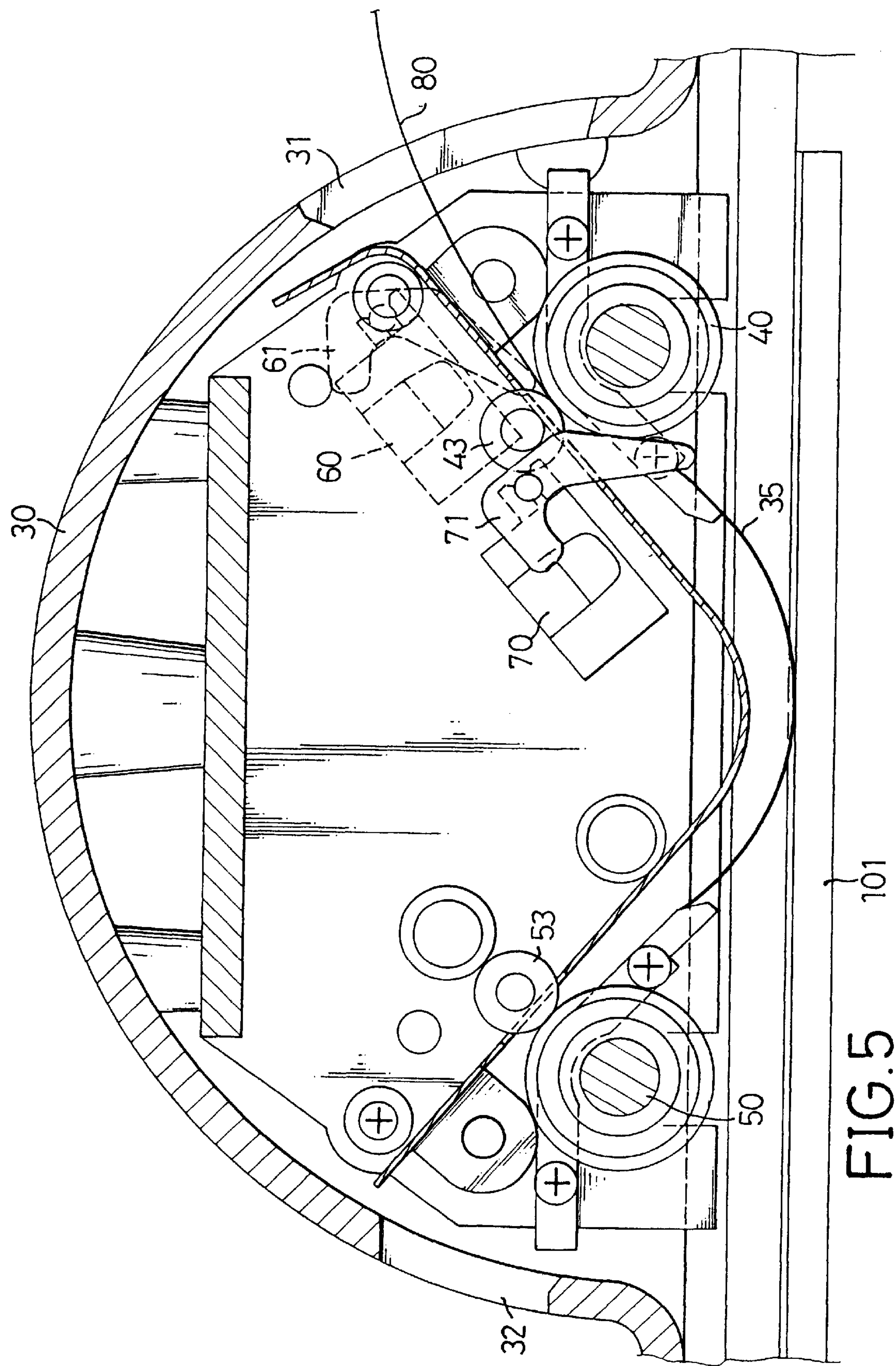
FIG. 5 is an enlarged view illustrating an operation of part of the present invention.

As shown in FIG. 5, the first activation tab 61 is firstly pushed aside so that the detecting switch 60 is enabled to start the motor 33 and then the motor 33 drives the inlet rollers 40 and the outlet rollers 50 to begin operating through the speed reduction gears 34 when the data sheet 80 is rolled in from the inlet 31, in which the roller 42 of the inlet rollers 40 and the passive rollers 43 are relatively rotated to feed in the data sheet 80.

Figure 6:
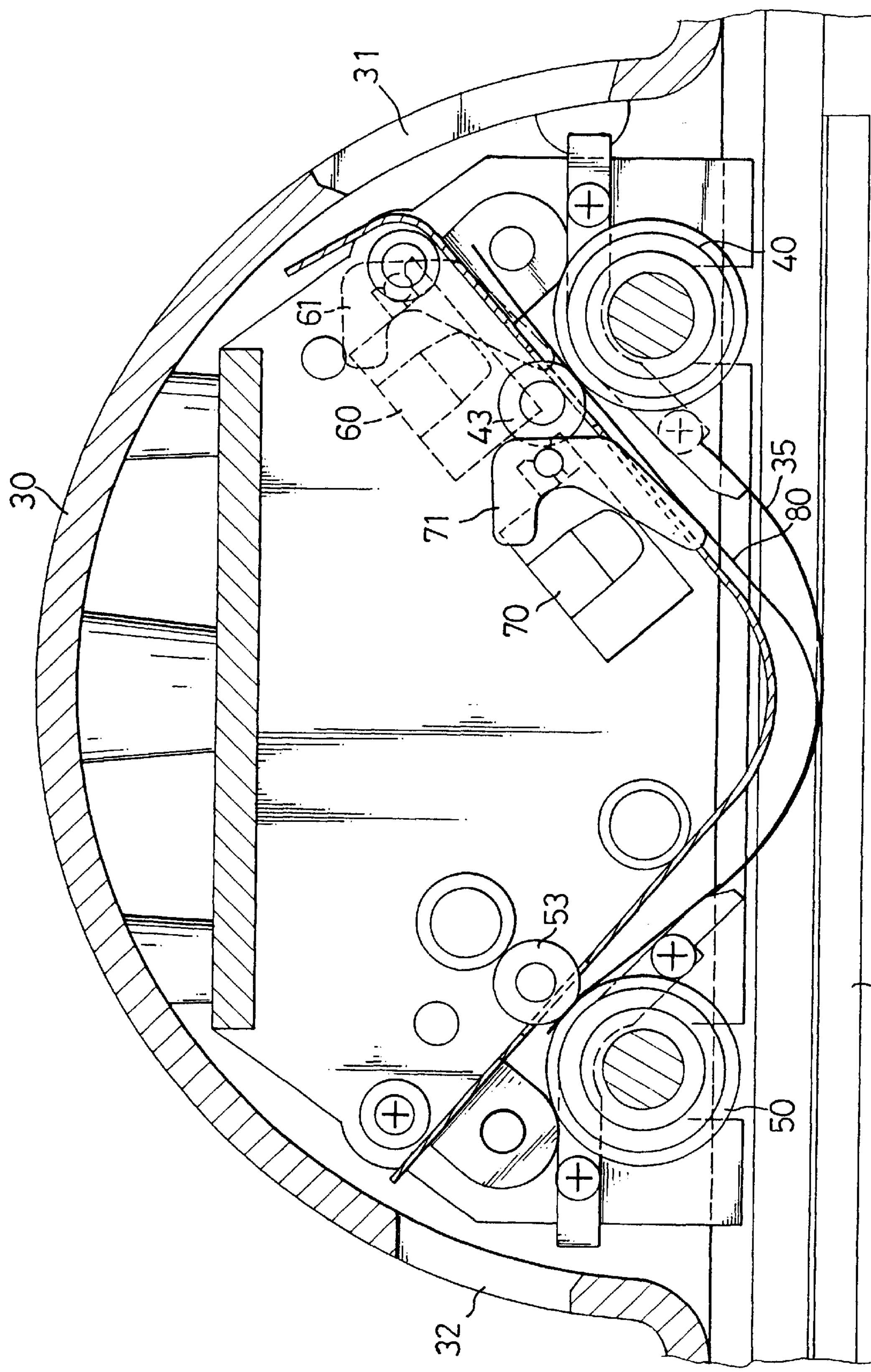
FIG. 6 is another enlarged view illustrating an operation of part of the present invention.

Also, as shown in FIG. 6, the second activation tab 71 is pushed by the front end of the data sheet 80 so that the scan activating switch 70 is enabled to start the optical module 102 in the scanning table 10 when the data sheet 80 is rolled out from the outlet rollers 40.

When the data sheet 80 continues moving forward, that is, the data sheet 80 moves ahead along the surface of the transparent guiding board 35 and passes along the bottom (vertex 92) of the transparent guiding board 35 proximate the transparent board 19 with the images or character patterns facing down such that the data sheet 80 can be scanned by the optical module 102 in the scanning table 10 for reading the images or character patterns on the data sheet 80.

Figure 7:
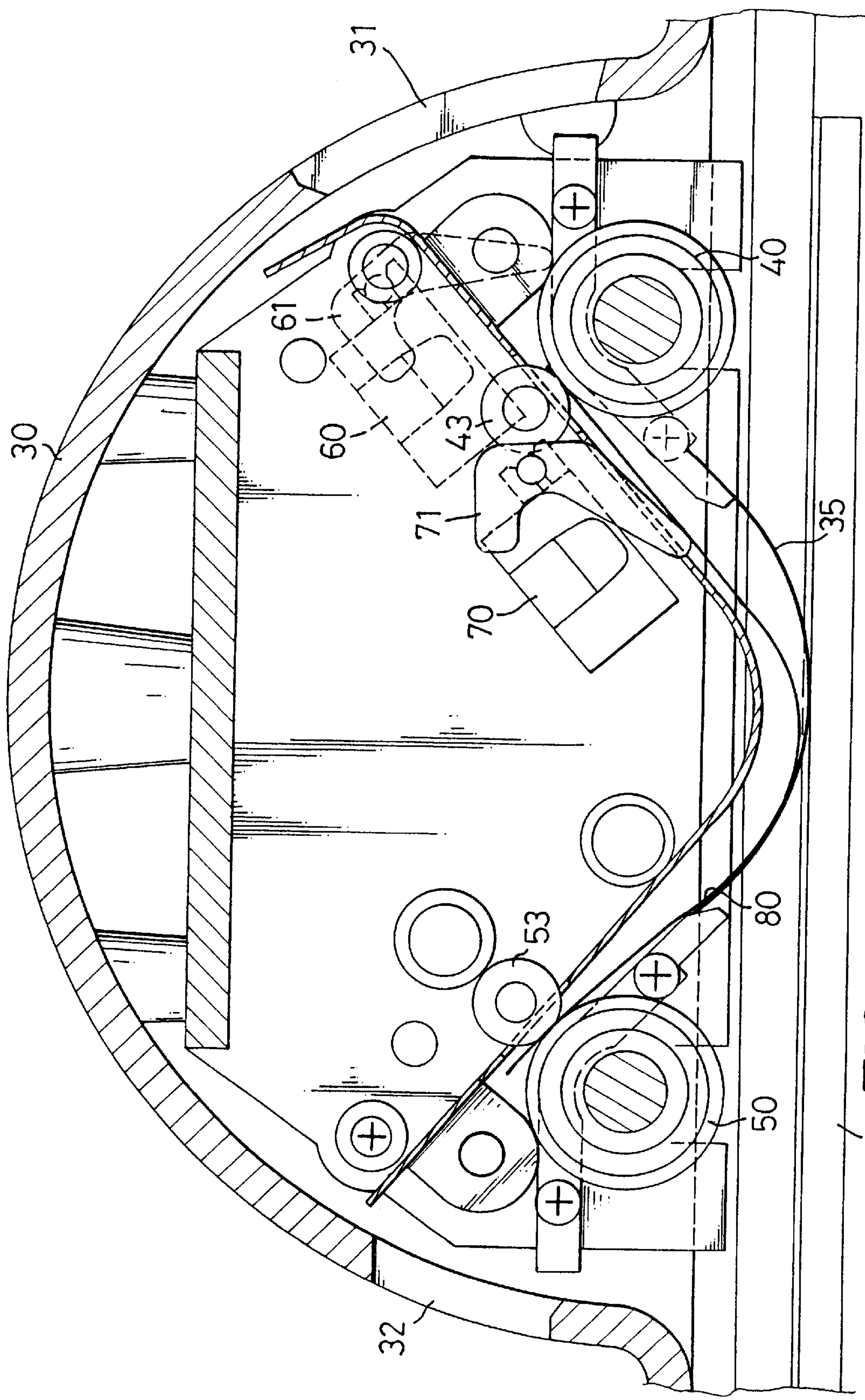
FIG. 7 is a still another enlarged view illustrating an operation of part of the present invention.

With the data sheet 80 being continuously rolled out by the inlet rollers 40, the front end of the data sheet 80 moves upward along the curvature of the surface of the transparent guiding board 35 so that the data sheet 80 can be grasped by the rollers 51 of the set of outlet rollers 50 and the passive rollers 53 which are rotated relatively as shown in FIG. 7, and then it is fed out through the outlet 32 to thereby finish reading the data sheet 80 by performing an automatic sheetfed operation with one sheet at a time.

Accordingly, having an automatic sheetfed device installed on the cover plate, the flat bed type scanner not only provides a general scan function, but also provides a function of automatically feeding data sheets one at a time when required so that the data sheet can be automatically fed by the internal driving mechanism and simultaneously scanned by the optical module without needing to lift the cover plate.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. A flat bed type scanner capable of automatically feeding data sheets one at a time, comprising:

a scanning table including a transparent board on an upper surface of said scanning table, a driving mechanism, and an optical module reciprocally moved by said driving mechanism;

a cover plate pivotally joined to an end of said upper surface of said scanning table with capability of being lifted and lowered; and an automatic sheetfed device installed at a predetermined position on said cover plate, wherein said automatic sheetfed device comprises:

an inlet and an outlet defined at two opposite sides of said sheetfed device;

a sheetfed motor;

a set of speed reduction gears driven by said sheetfed motor;

a set of inlet rollers positioned proximate said inlet and driven by said set of speed reduction gears;

a set of outlet rollers positioned proximate said outlet and also driven by said set of speed reduction gears;

a transparent guiding board having a bottom surface adapted to contact said transparent board, and a top surface adapted to guide a data sheet from said set of inlet rollers to said set of outlet rollers, the transparent guiding board extending continuously from a first point proximate said set of inlet rollers to a second point proximate said set of outlet rollers, the transparent guiding board curved to form a substantially parabolic shape with a vertex proximate said transparent board;

a detecting switch mounted between said inlet and said set of inlet rollers for controlling ON and OFF statuses of said sheetfed motor;

a first tab pivotally mounted proximate said inlet, said first tab configured to activate said detecting switch to the ON status of said sheetfed motor when a data sheet is passed through said inlet;

a scan activating switch mounted between said set of inlet rollers and said vertex of said transparent guiding board for controlling the start and stop of said optical module; and a second tab pivotally mounted between said set of inlet rollers and said vertex, said second tab configured to activate said scan activating switch when the data sheet is passed through said set of inlet rollers.

2. The flat bed type scanner as claimed in claim 1, wherein said driving mechanism comprises a scanning motor and a drive belt driven by said scanning motor.

3. The flat bed type scanner as claimed in claim 1, wherein said optical module is composed of a contact image sensor.

4. The flat bed type scanner as claimed in claim 1, wherein said optical module is composed of a charge coupled device image detector.

5. The flat bed type scanner as claimed in claim 1, wherein said automatic sheetfed device is installed at the predetermined position on said plate cover and the space under the predetermined position is transparent.

6. The flat bed type scanner as claimed in claim 1, wherein said optical module is moved by said driving mechanism to a fixed position bellow said transparent guiding board when said detecting switch is activated to said ON status of said motor.

7. A flat bed type scanner capable of automatically feeding data sheets one at a time, comprising:

a scanning table including a transparent board on an upper surface of said scanning table, a driving mechanism, and an optical module reciprocally moved by said driving mechanism;

a cover plate pivotally joined to an end of said upper surface of said scanning table with capability of being lifted and lowered; and an automatic sheetfed device installed at a predetermined position on said cover plate, wherein said automatic sheetfed device comprises:

an inlet and an outlet defined at two opposite sides of said sheetfed device;

a sheetfed motor;

a set of speed reduction gears driven by said sheetfed motor;

a set of inlet rollers positioned proximate said inlet and driven by said set of speed reduction gears;

a set of outlet rollers positioned proximate said outlet and also driven by said set of speed reduction gears;

a transparent guiding board adapted to guide a data sheet from said set of inlet rollers to said set of outlet rollers, said transparent guiding board curved to form a substantially parabolic shape with a vertex proximate said transparent board;

a detecting switch for controlling ON and OFF statuses of said sheetfed motor;

a first tab mounted proximate said inlet and coupled to said detecting switch, said first tab configured to activate said detecting switch to the ON status of said sheetfed motor when a data sheet is passed through said inlet;

a scan activating switch for controlling the start and stop of said optical module; and a second tab mounted between said set of inlet rollers and said vertex and coupled to said scan activating switch, said second tab configured to activate said scan activating switch when said data sheet is passed through said set of inlet rollers.

8. The flat bed type scanner as claimed in claim 7, wherein said driving mechanism comprises a scanning motor and a drive belt driven by said scanning motor.

9. The flat bed type scanner as claimed in claim 7, wherein said optical module includes a contact image sensor.

10. The flat bed type scanner as claimed in claim 7, wherein said optical module includes a charge coupled device image detector.

11. The flat bed type scanner as claimed in claim 7, wherein said automatic sheetfed device is installed at the predetermined position on said plate cover and the space under the predetermined position is transparent.

12. The flat bed type scanner as claimed in claim 7, wherein said optical module is moved by said driving mechanism to a fixed position bellow said transparent guiding board when said detecting switch is activated to said ON status of said motor.

13. A flat bed type scanner capable of automatically feeding data sheets one at a time, comprising:

a scanning table including a transparent board on an upper surface of said scanning table, a driving mechanism, and an optical module reciprocally moved by said driving mechanism;

a cover plate pivotally joined to an end of said upper surface of said scanning table with capability of being lifted and lowered; and an automatic sheetfed device installed at a predetermined position on said cover plate, wherein said automatic sheetfed device comprises:

an inlet and an outlet defined at two opposite sides of said sheetfed device;

a sheetfed motor;

a set of speed reduction gears driven by said sheetfed motor;

a set of inlet rollers positioned proximate said inlet and driven by said set of speed reduction gears;

a set of outlet rollers positioned proximate said outlet and also driven by said set of speed reduction gears;

a transparent guiding board including a bottom surface adapted to contact said transparent board, and a top surface adapted to guide a data sheet from said set of inlet rollers to said set of outlet rollers, the transparent guiding board extending continuously from a first point proximate said set of inlet rollers to a second point proximate said set of outlet rollers, the transparent guiding board curved to form a substantially parabolic shape with a vertex proximate said transparent board;

a detecting switch proximate said inlet and coupled to said detecting switch for controlling ON and OFF statuses of said sheetfed motor; and a scan activating switch proximate said vertex for controlling the start and stop of said optical module.

14. The flat bed type scanner as claimed in claim 13, wherein said driving mechanism comprises a scanning motor and a drive belt driven by said scanning motor.

15. The flat bed type scanner as claimed in claim 13, wherein said optical module includes a contact image sensor.

16. The flat bed type scanner as claimed in claim 13, wherein said optical module includes a charge coupled device image detector.

17. The flat bed type scanner as claimed in claim 13, wherein said automatic sheetfed device is installed at the predetermined position on said plate cover and the space under the predetermined position is transparent.

18. The flat bed type scanner as claimed in claim 13, wherein said optical module is moved by said driving mechanism to a fixed position bellow said transparent guiding board when said detecting switch is activated to said ON status of said motor.

* * * * *